Feb. 3, 1931.  D. M. FLICK  1,791,304

CATCH ALL AND ENTRAINMENT SEPARATOR

Filed June 9, 1926

Inventor
Daniel M. Flick
By Nissen & Crane attys.

Patented Feb. 3, 1931

1,791,304

UNITED STATES PATENT OFFICE

DANIEL M. FLICK, OF CHICAGO, ILLINOIS, ASSIGNOR TO WURSTER & SANGER, INC., OF CHICAGO, ILLINOIS, A CORPORATION OF ILLINOIS

CATCH-ALL AND ENTRAINMENT SEPARATOR

Application filed June 9, 1926. Serial No. 114,627.

This invention relates to apparatus for separating entrained liquid from gaseous materials, as, for example, the separation of liquors, oil, water, etc., from steam or other gases, all of which are encountered in evaporation, lubrication of reciprocating engines and condensation in pipe lines carrying saturated steam. The apparatus may be used, for example, to separate glycerine which is entrained by the moisture in the vapor in the evaporation of water from glycerine liquor under pressure or vacuum. One example of an evaporating system in which the present invention is useful is that shown in the Patent No. 1,508,130, granted September 9, 1924, to Walter E. Sanger, deceased. In the evaporating system shown in that patent, the present invention could be utilized to advantage to replace the catch-all shown at 37 in Fig. 1 of the patent. Many other uses of the invention will readily suggest themselves to those skilled in the art.

The object of the invention is to provide an entrainment separator which will operate by centrifugal force and in which the separated particles will be immediately removed from the path of the gaseous material from which it is separated.

Another object of the invention is to provide a separator having a catch-all chamber in which the separated liquid may be collected and in which it will be free from the action of the moving gas from which it is separated.

Another object is to provide an entrainment separator which shall be of improved construction and operation. Other objects will appear hereinafter.

The invention is exemplified in the combination and arrangement of parts shown in the accompanying drawings and described in the following specification, and it is more particularly pointed out in the appended claims.

In the drawings:—

Figure 1:
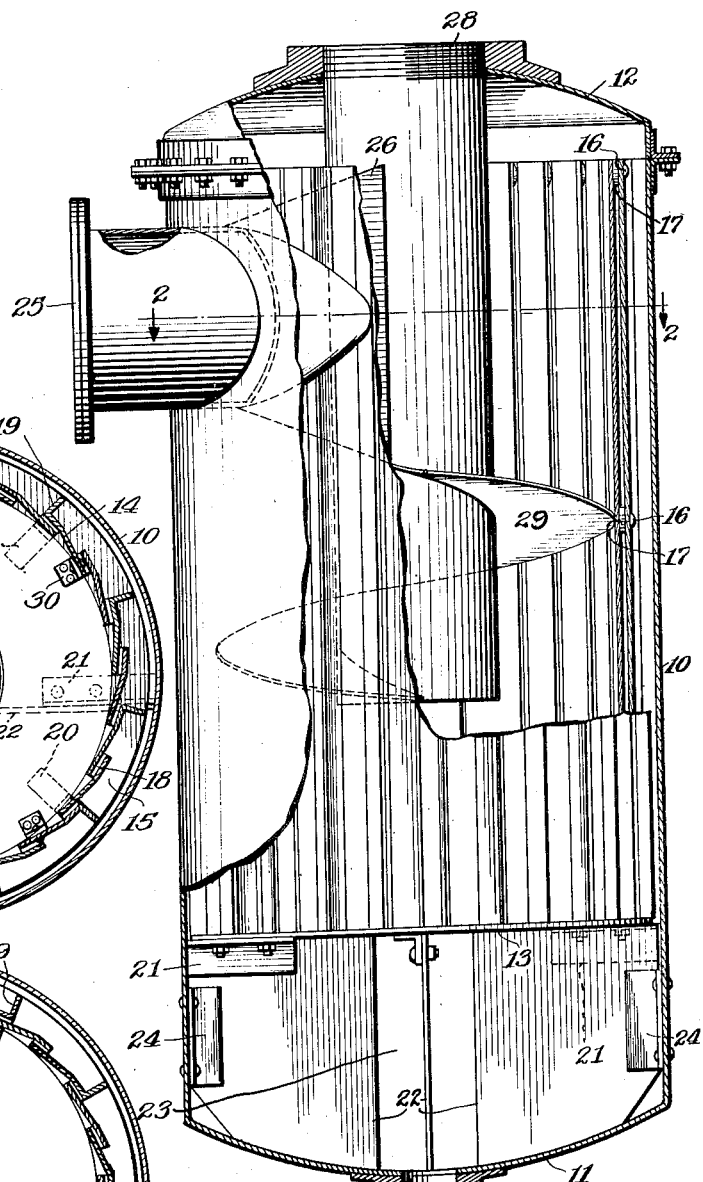
Fig. 1 is an elevation of one embodiment of the present invention with parts broken away and other parts in section.
Figure 2:
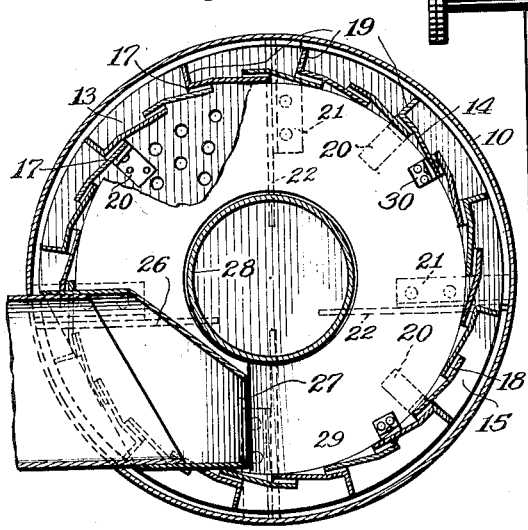
Fig. 2 is a horizontal section substantially on line 2—2 of Fig. 1.

In the form of the invention illustrated in Figs. 1 and 2, a cylindrical shell or casing 10 is provided having preferably an outwardly curved bottom 11 and a removable cover 12. Within the casing 10 is a liner comprising a perforated plate 13 upon which there are mounted vertical plates 14 disposed in cylindrical formation and spaced inwardly from the wall 10 to provide an annular space 15 between the wall and liner. The plates 14 are secured together in overlapping relation by rivets 16, the overlapping portions of the plates being held in spaced relation by washers 17 to provide tangential slots or louvers 18. Some or all of the plates 14 may be provided with outwardly bent flanges 19 which extend into the space 15 to form baffles for intercepting movement of air or gas within the annular space outside of the liner. The plates 14 when secured together by the rivets 16 form a substantially rigid hollow cylinder which is secured to the top of the perforated plate 13 by angle brackets 20 riveted at spaced intervals to the top of the plate and to the liner. The perforated plate 13 is in turn supported by angle brackets 21 secured to baffle plates 22 within the space 23 below the plate 13. The baffle plates 22 may be secured to the side walls 10 by angle brackets 24. Steam, or other gaseous matter having liquid particles entrained therein, is introduced through a conduit 25 passing through the side wall 10 and provided within the separator with a transmission piece 26 which is flattened to provide a rectangular opening 27 disposed at one side of the separator and arranged to discharge the gaseous material in a tangential direction on the inside of the liner. The opening 27 in the transmission piece is preferably of a size equal to or slightly greater than the cross-sectional area of the conduit 25 so that no resistance is offered to the entrance of the steam or gas into the separator. The steam escapes from the separator through a central pipe 28 supported from the cover 12 and open at its bottom at a position below the transmission piece 26. A helical deflector plate 29 surrounds the discharge pipe 28 and extends from the bottom of the transmission piece to the bottom of the discharge pipe 28. The deflector plate may be supported from the liner by means of angle brackets 30 or other suitable connection with the liner.

The entrance of the steam in a tangential direction from the transmission piece 26 produces a rapid whirling action within the liner. The helical plate 29 augments this whirling action, making it necessary for the steam to circulate about the interior of the separator before it can escape through the bottom of the pipe 28. The centrifugal force set up by the whirling action throws all of the entrained matter, froth, etc., against the inner surface of the plates 14. The liquid particles impinging on the inner surface of the liner continue to move in the same direction as the vapors and thus immediately pass through the louvers 18 between the plates 14. There is no circulation in the annular chamber outside the liner. The frictional resistance of the surfaces would, to a large degree, prevent any circulation in this space, but, to further insure quiet in this space, the baffles 19 are provided. When the separated liquid particles are thrown into the annular space outside the liner, they are therefore removed from further contact with the rapidly moving vapors within the liner and are free to settle at the bottom of the annular space and pass through the perforated plate 13 or around the outer edge thereon into the catch-all 23. The complete and immediate removal of the separated particles from the path of further influence of the vapors is a large factor in producing the effectiveness and superiority of this device over devices previously built for this purpose. The perforated bottom plate 13 separates the vapor chamber from the liquid chamber 23 and prevents the rapidly moving vapors from setting up a whirling motion within the liquid chamber and thus picking up liquid from the chamber. The baffle plates 22 assist in preventing rotation of the liquid within the chamber 23. The liquid collected within the catchall is thus permitted to drain quietly back to the evaporator, receiving tank, well, or other receptacle provided for this purpose. It will be seen that the separated particles are thrown through the louvers 18 of the liner into the dead space 15 and the vapors travel in a helical course to the bottom of the discharge pipe 28 where they enter the pipe and pass upward and out of the separator without crossing the path of the separated liquid. The separator does not depend for its effectiveness on the impact of the vapors against the baffle with the accompanying forceful and sharp change in direction of flow which causes frictional resistance and reduction in pressure and speed. The vapors enter through the transmission piece and travel through the separator at a high velocity following a gradual helical path around the discharge pipe and along the helical plates. There is, therefore, no sharp changing of direction of flow of the vapors, substantially no retardation of velocity and substantially no back pressure.

It will be noted that the separator is of adequate size to provide a catchall space below the inner liner. During the operation of evaporation of many liquids, the liquid may at times prime or boil over. Where the present invention is installed, there is ample capacity in the bottom or catchall space 23 to hold any liquor collected in excess of the immediate capacity of the return pipe. This will retain the liquor out of the path of the vapors and permit it to drain to the evaporator or other receptacle without danger of being carried over with the moving vapor.

Figure 3:
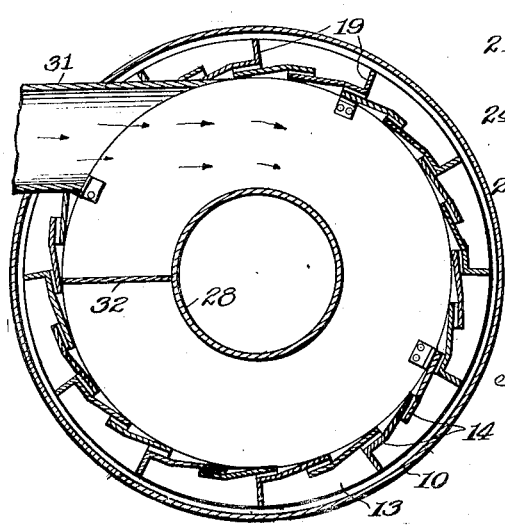
Fig. 3 is a view similar to Fig. 2 showing a somewhat modified form of the invention.

In the form of the invention shown in Fig. 3, the entering conduit 31 is smaller than that shown in Figs. 1 and 2 so that a transmission piece is unnecessary for directing the entering vapors in a tangential direction within the separating chamber. In this case, the upper end of the helical plate 29 is carried past the point of entrance of the conduit 31 and bent upwardly as shown at 32 to prevent any tendency of the entering vapor to circulate in the wrong direction.

I claim:—

1. A separator comprising a cylindrical casing, a liner for said casing having upright plates arranged to overlap each other at their edges, a conduit extending into the interior of said liner and disposed in a tangential direction for imparting whirling motion to fluid discharged from said conduit into said liner, said liner plates having flanges extending into the space between said liner and the wall of said casing to prevent rotation of material within the space between said liner and casing wall, a discharge pipe extending through the top of said casing and having its lower end open at a point below the point of entry of said conduit, a helical plate surrounding said discharge pipe and connecting said conduit with the lower end of said discharge pipe, a perforated plate separating said casing into upper and lower chambers, and upright baffle plates disposed in said lower chamber, said lower chamber having a discharge opening through the bottom thereof to permit liquid collected therein to drain away.

2. In a separator for removing entrainment from vapors, an outer shell, a perforated plate dividing said outer shell into an upper and a lower chamber, an inner tubular liner in said upper chamber providing an annular space between said liner and chamber, said liner having tangential openings therein directed into said annular space, an outlet pipe extending into said upper chamber through the top thereof, an inlet pipe opening into the side of said liner, a spiral member within said upper chamber leading from said inlet pipe around said outlet pipe in the direction of said tangential openings for causing a whirling motion of the incoming vapors to throw entrained liquid through said tangential openings into said annular space.

3. In a separator for removing entrainment from vapors comprising an outer shell, an inner tubular liner within said shell providing an annular space between said liner and shell comprising a bottom perforated plate, a series of longitudinal plates arranged in spaced relation to form slots between the sides of said plates leading into said annular space, said plates being secured together and to said perforated plate to form a complete independent unit for insertion into said shell, means supporting said perforated plate within said shell spaced from the bottom thereof, and means for discharging vapors into said liner in the direction of said slots to produce a whirling motion to direct entrained liquid through said slots into said annular space.

4. In a separator for removing entrainment from vapors, an outer shell, an inner tubular liner providing an annular space between said liner and shell comprising a series of overlapping longitudinal plates secured together, means holding the overlapping portions of said plate in spaced relation to form slots between said overlapping plates, and means for discharging vapors into said liner in the direction of said slots to produce a whirling motion to direct entrained liquid through said slots into said annular space.

5. In a separator for removing entrainment from vapors, an outer shell, an inner tubular liner providing an annular space between said liner and shell comprising a series of overlapping longitudinal plates secured together, means holding the overlapping portions of said plate in spaced relation to form slots between said overlapping plates, a perforated plate below said longitudinal plates spaced from the bottom of said shell to form a liquid reservoir, and means for discharging vapor into said liner in the direction of said slots to produce a whirling motion to direct entrained liquid through said slots into said annular space.

6. In a separator for removing entrainment from vapors, an outer shell, an inner tubular liner providing an annular space between said liner and shell comprising a bottom perforated plate, a series of longitudinal plates overlapping at their side portions, means securing said longitudinal plates to said perforated plate, and means securing said longitudinal plates together at their overlapping portions to form a complete independent unit of said liner, means spacing apart the side portions of said longitudinal plates to form slots leading into said annular space, means supporting said liner with said perforated plate spaced from the bottom of said shell to form a liquid chamber, and means for discharging vapors into said liner in the direction of said slots to produce a whirling motion to direct entrained liquid through said slots into said annular space.

7. In a separator for removing entrainment from vapors, an outer shell, an inner tubular liner providing an annular space between said liner and shell comprising a series of overlapping longitudinal plates secured together, means holding the overlapping portions of said plate in spaced relation to form slots between said overlapping plates, an outlet pipe extending through the top of said shell into said liner, an inlet pipe opening into the side of said liner, and a spiral extending from said inlet pipe around said outlet pipe in the direction of said slots for causing a whirling motion of the incoming vapors to throw entrained liquid through said slots into said annular space.

8. In a separator for removing entrainment from vapors, an outer shell, an inner tubular liner providing an annular space between said liner and shell comprising a series of overlapping longitudinal plates secured together, means holding the overlapping portions of said plate in spaced relation to form slots between said overlapping plates, a perforated plate below said longitudinal plates spaced from the bottom of said shell to form a liquid reservoir, an outlet pipe extending through the top of said shell into said liner, an inlet pipe opening into the side of said liner, and a spiral extending from said inlet pipe around said outlet pipe in the direction of said slots for causing a whirling motion of the incoming vapors to throw entrained liquid through said slots into said annular space.

In testimony whereof I have signed my name to this specification on this 29th day of May, A. D. 1926.

DANIEL M. FLICK.